United States Patent [19]
Leschek

[11] 3,991,313
[45] Nov. 9, 1976

[54] METHOD AND APPARATUS FOR ACOUSTICALLY MONITORING NEUTRON FLUX RADIATION

[75] Inventor: Walter C. Leschek, Pittsburgh, Pa.

[73] Assignee: Westinghouse Electric Corporation, Pittsburgh, Pa.

[22] Filed: Jan. 29, 1975

[21] Appl. No.: 545,234

[52] U.S. Cl. .............................. 250/390; 250/391
[51] Int. Cl.² .......................................... G01T 3/00
[58] Field of Search ............... 250/390, 391, 392

[56] References Cited
UNITED STATES PATENTS
2,926,261  2/1960  Truell et al. .................... 250/392

*Primary Examiner*—Davis L. Willis
*Attorney, Agent, or Firm*—D. C. Abeles

[57] ABSTRACT

A neutron flux radiation detector is provided that utilizes neutron radiation induced nonlinear acoustic behavior in water, with the resultant mixing of two ultrasonic signals in transit through the liquid, to provide a measure of ambient radiation levels. Nonlinear elastic properties are imparted to the water by the presence of microcavities which are formed when high-energy neutrons collide with the waters atomic nuclei.

The detector employs an ultrasonic transmitting transducer which is driven simultaneously at two different frequencies. The acoustic output is transmitted through a container housing a pool of distilled water. Only when radiation is present will the acoustic signals in transit through the water undergo harmonic distortion and "mix", thereby generating sum and difference frequencies. These sum and difference frequencies are then sensed using a separate receiving transducer, and are identified as a measure of the ambient radiation level.

13 Claims, 1 Drawing Figure

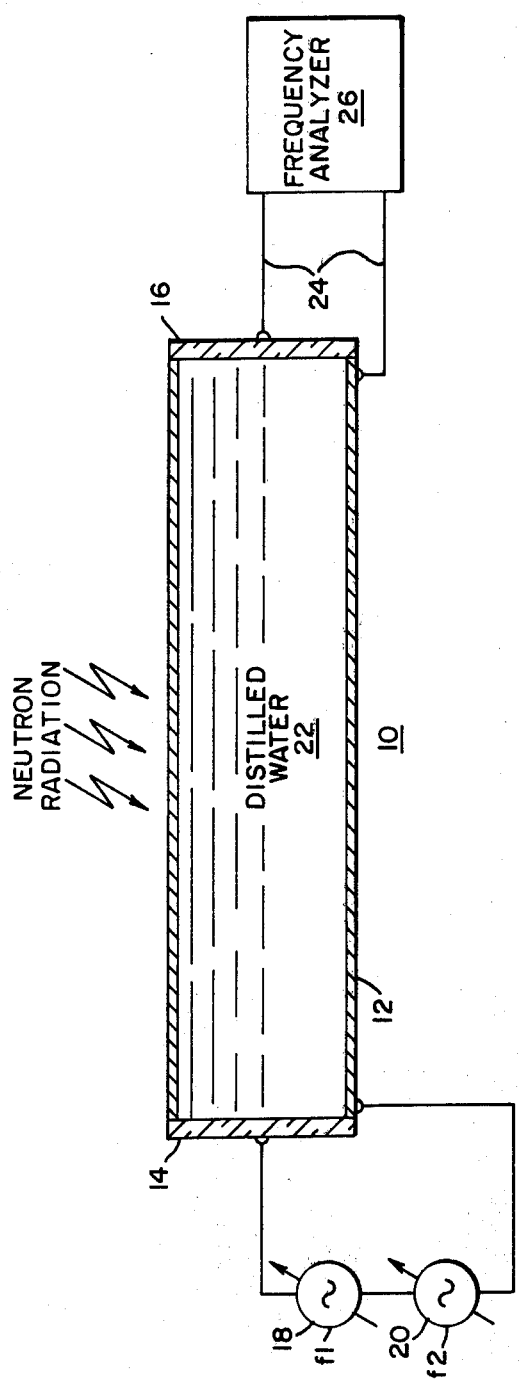

METHOD AND APPARATUS FOR ACOUSTICALLY MONITORING NEUTRON FLUX RADIATION

BACKGROUND OF THE INVENTION

This invention pertains generally to neutron flux radiation detectors and more particularly to ultrasonic monitors that measure neutron flux radiation levels.

Generally, there are three categories of nuclear radiation detectors presently available in the art. The categories can be broadly classified respectively as solid state or semiconductor detectors, scintillation counters, and gas filled detectors such as ion chambers and proportional counters. In all cases, the electrical output signal is basically a current which flows for a brief period of time; i.e., an impulse charge, the dimensions of which is the product of current and time. The area of the impulse, the total charge generated by each ray or particle absorbed in the detector, is directly proportional to the absorbed energy. The duration of the output current varies with the type of detector and with the nature and energy of the radiation. The currents of the shortest duration, e.g., 0.1 to 10 nanoseconds, occur in plastic scintillators and narrow-depletion-depth semiconductor detectors and the longest current durations of approximately 0.1 to 5 microseconds occur in gas-filled detectors. Scintillators, such as sodium iodide and cesium iodide exhibit outputs with intermediate current durations of approximately 0.75 to 1.5 microseconds.

In semiconductor detectors, the energy conversion factors are $W = 2.8$ and $3.5$ electron-volts per electronic charge for germanium and silicon, respectively. No charge multiplication occurs in semiconductor detectors. In scintillation counter dectectors, the effective $W$ is 3 to 30 Kiloelectron-volts per electron with multiplication factors as high as $10^8$ occurring in the photomultiplier. In gas-filled detectors, the conversion factor is 25 to 36 electron-volts per ion pair. No multiplication occurs in ion chambers, but multiplication factors of as high as $10^4$ are common for proportional counter detectors. Thus, depending on the detector and the energy of the ambient radiation being monitored, signal strengths may vary from those at amplifier noise levels to amplitudes at which noise is negligible. Accordingly, the energy, the desired resolution and the expected counting rate of the radiation to be detected, will determine the choice of the detector.

Generally, the biasing circuits employed for both semiconductor and gas-filled detectors are quite similar. The detector leakage current flowing through the resistor commonly in series with the biasing voltage will cause a loss of biasing voltage. For room temperature Surface Barrier Detectors, this current is typically between 0.1 and 1 microampere. In gas counter detectors and cooled Ge or Si detectors, the leakage current is usually negligible. Additional bias voltage loss is generally caused by the average signal current flowing through the resistor which equals $nq = (nE/W)$ amperes, where $q$ is the charge of an electron, $n$ is the counting rate, $E$ is the energy absorbed in the detector, and $W$ is the energy conversion factor in electron voltages per ion pair.

Both leakage current and the bias resistor introduce noise. The leakage current introduces shot noise while the resistor introduces what is known as Johnson noise. Although the mechanism of noise generation is different for each case, their respective noise contributions are indistinguishable.

Another potential noise source is a capacitor which is normally used to AC couple the detector to the preamplifier while isolating the bias voltage from the input. The voltage rating of the capacitor must satisfy the highest detector bias used, and the capacitor must be noise free at that voltage. Low leakage capacitors such as mylar or high quality ceramic dielectric capacitors are generally recommended.

Both semiconductor and gas-filled nuclear radiation detectors require the use of a DC high voltage bias for operation. Also, the nature of their output signals is such that relatively little can be done to improve their signal-to-noise ratio when they are operated in severe industrial environments. A nuclear radiation detector that does not require a DC bias voltage, and whose output signal frequency is adjustable for an optimum signal-to-noise ratio, will supply substantial improvement in detector responses obtained in the severe operating environment encountered in most environment nuclear applications.

SUMMARY OF THE INVENTION

Briefly, this invention overcomes the deficiencies exhibited by the prior art and satisfies the characteristics desired in severe environment applications by providing an acoustic method and apparatus for measuring neutron flux radiation levels. The method and apparatus of this invention employ an acoustically conductive medium having a material property of exhibiting a change in elasticity in response to incident radiation. Specificially, neutron radiation induced nonlinear acoustic behavior in a liquid is utilized to provide a measure of ambient radiation levels. Nonlinear elastic properties are imparted to the liquid by the presence of microcavities which are formed when high-energy neutrons collide with the liquids atomic nuclei. An acoustic source is communicably coupled to the medium in a manner to direct an acoustic signal along a path into and through the medium. Only while in transit through an irradiated portion of the liquid will the acoustic signal undergo harmonic distortion. The signal is received after it has traversed a given path through the medium and is converted into a corresponding electrical output. The harmonic distortion of the received signal provides a representative measure of the incident radiation.

Desirably, in the preferred embodiment, the source of sound is driven simultaneously at two different frequencies, thereby transmitting two individual acoustic signals into the liquid acoustic medium. While in transit through an irradiated portion of the liquid the two signals will undergo harmonic distortion and "mix", thereby generating sum and difference frequencies. The sum and difference frequencies are then sensed using a separate receiving transducer, and are identified as a measure of the ambient radiation level. In addition, the driving frequencies of the source can be chosen so as to adjust either the sum or difference frequency signal, which is communicated to the receiver, to lie in a frequency band where a maximum signal-to-noise ratio is empirically found to exist.

BRIEF DESCRIPTION OF THE DRAWINGS

For better understanding of the invention, reference may be had to the preferred embodiment, exemplary of the invention, shown in the accompanying drawing in which the exemplary mode of practicing this invention is schematically illustrated.

DESCRIPTION OF THE PREFERRED EMBODIMENT

When high intensity ultrasonic waves are propagated in a liquid, small bubbles of gas or vapor are formed within the liquid. This effect is known as cavitation and occurs in sound fields having an intensity of a few watts per square centimeter. Cavitation occurs as a result of the net pressure (i.e., acoustic plus static ambient pressure) during a sound cycle becoming momentarily negative and so subjecting the liquid to tension. Piezoelectric crystals can be used to sonically induce cavitation up to the megacycle frequency range. Cavitation bubbles induced in this manner decrease in size with increasing frequency.

A liquid acquires nonlinear acoustic properties prior to and after the onset of cavitation. Specifically, nonlinear elastic properties are imparted to a liquid by the presence of microcavities which are formed when high-energy neutrons of approximately 10 MEV or greater (hereinafter referred to as high-energy neutrons) collide with the liquids atomic nuclei. This means that a pure sine wave acoustic signal will undergo harmonic distortion as it transits the irradiated liquid, and that a number of pure sine wave acoustic signals of different frequencies will "mix" while in transit through the liquid to produce sum and difference frequency signals.

The phenomenon of cavitation has been under investigation for years by a number of research institutions. It has been shown through experiment that the neutron components of cosmic radiation produce cavitation nuclei in water. The mechanism by which this occurs is throught to be through the creation of oxygen recoil nuclei. It is believed that the energy deposit and radiolytic effects produce small overheated regions in which cavities may originate. The microcavities, thus formed, can then grow to visible size when the pressure is reduced below the vapor pressure of water. Experimental studies have been conducted on the effect of shielding on the inception of cavitation, and have demonstrated that shielding from cosmic radiation does indeed reduce the threshold for ultrasonically induced cavitation.

This invention employs the principle that neutron radiation will induce nonlinear acoustic behavior in a liquid. Specifically, nonlinear elastic properties are imparted to the liquid by the presence of microcavities which are formed when high-energy neutrons collide with the liquids atomic nuclei. This nonlinear behavior will exist both prior to and after the onset of cavitation, but the magnitude of the phenomenon will be greater after the onset of cavitation.

A preferred mode of operation of this invention embodied in an ultrasonic neutron flux radiation detector is illustrated in the Figure. The detector 10 exemplarily illustrated incudes an elongated sealed tubular housing 12 constructed of a material such as glass which is filled with distilled water 22. The terminations of the cylindrical housing are capped by piezoelectric transducers 14 and 16 which desirably operate in the ultrasonic frequency range and respectively function as a transmitter and receiver. Preferably, the transmitting crystal is driven simultaneously at two frequencies, $f_1$ and $f_2$, so as to set up high amplitude acoustic standing waves in the water. The level of applied ultrasonic excitation is lower than that needed to produce intrinsic nonlinear acoustic properties in the water, a phenomenon otherwise known as "finite amplitude" effects. In the absence of high-energy neutron radiation, the receiving crystal 16 detects acoustic signals only at the frequencies of $f_1$ and $f_2$. When the detector is irradiated with energy neutrons, the water acquires nonlinear acoustic properties. The neutron activated nonlinear water will function to "mix" the transmitted acoustic signals of frequencies $f_1$ and $f_2$ while in transit, thereby generating sum and difference frequencies, $(f_1 + f_2)$ and $(f_1 - f_2)$, which will appear at the receiving crystal 16 in addition to the transmitted frequencies of $f_1$ and $f_2$. The strength of the sum $(f_1 + f_2)$ and difference $(f_1 - f_2)$ frequencies provides a measure of the ambient irradiating neutron flux. The output transducer 16 converts the received ultrasonic signal into a corresponding electrical output 24 which is communicated to a frequency analyzer 26, which in turn identifies the sum and difference signals as a measure of the neutron irradiation. In addition, tunable electronic signal generators 18 and 20 can be provided to supply sound source signals at frequencies $f_1$ and $f_2$ so that either the sum $(f_1 + f_2)$ or difference $(f_1 - f_2)$ frequency signal, which is communicated to the receiver, can be adjusted to lie in a frequency band where a maximum signal-to-noise ratio is empirically found to exist.

Accordingly, the method and apparatus of this invention employ an AC acoustic detector bias rather than a DC voltage detector bias. The acoustically conducting medium having the property of exhibiting a change from linear to nonlinear dynamic elasticity in response to incident high-energy neutron radiation is acoustically driven to the brink of nonlinearity to any degree desired, thereby adjusting the detector sensitivity. An AC bias permits transformers and low voltage cable to be used in place of the quality grade high voltage cable that is normally needed for a DC bias.

Furthermore, the signal-to-noise ratio of an operating detector can be adjusted and maximized by choosing the driving frequencies $f_1$ and $f_2$ so that either the sum or the difference frequency occur in a frequency band where the high-energy neutron induced dynamic elastic nonlinearity threshold sensitivity is maximized while background noise is at a minimum.

Thus, the method and apparatus of this invention provide improved response in an application in hostile radiation environments.

What is claimed is:

1. An acoustic neutron flux radiation detector comprising;
    an acoustically conductive medium having a material property of exhibiting a change from linear to nonlinear dynamic elasticity in response to incident neutron radiation;
    an acoustic source communicably coupled to the medium in a manner to direct an acoustic signal along a path into and through the medium;
    an acoustic receiver communicably coupled to the medium at a spaced location from the source and positioned to receive the acoustic signal transmitted by the source after it has traversed a given path through the medium and provide a corresponding electrical output representative of the received signal; and
    means coupled to the receiver for identifying the degree of harmonic distortion within the received signal as a representative measure of the incident radiation.

2. The detector of claim 1 wherein the source is designed to transmit acoustic frequencies within the ultrasonic range.

3. The detector of claim 1 wherein in the acoustic source comprises an acoustic transducer which is driven simultaneously at two frequencies.

4. The detector of claim 3 wherein the means coupled to the receiver indentifies the strength of the sum or difference frequencies of the transmitted frequencies communicated to the receiver as a measure of the incident radiation.

5. The detector of claim 3 including means for adjusting the two driving frequencies of the source to maximize the signal-to-noise ratio of the sum or difference frequencies communicated to the receiver.

6. The detector of claim 1 wherein the medium comprises distilled water.

7. The detector of claim 1 wherein the material property exhibits nonlinear acoustic characteristics in response to incident radiation.

8. The detector of claim 1 wherein the acoustic source provides a signal of a given frequency lower than that needed to produce nonlinear acoustic properties in the medium in the absence of radiation.

9. A method of detecting neutron flux radiation comprising the steps of:

communicably coupling an acoustic transducer to an acoustically conductive medium having a material property of exhibiting a change from linear to nonlinear dynamic elasticity in response to incident radiation;

driving the transducer to provide an acoustic output signal;

transmitting the acoustic signal through the medium;

receiving the acoustic signal after it has traversed a given path through the medium; and providing an electrical output corresponding to the harmonic distortion of the received acoustic signal representative of a measure of the incident radiation.

10. The method of claim 9 wherein the driving step drives the transducer simultaneously at two frequencies.

11. The method of claim 10 including the step of identifying the strength of the sum or difference frequencies of the transmitted frequencies received.

12. The method of claim 11 including the step of adjusting the two driving frequencies to maximize the signal-to-noise ratio of the sum or difference frequencies received.

13. The method of claim 12 wherein the adjusting step selects the two driving frequencies to maximize the signal-to-noise ratio of the electrical output.

* * * * *